Patented July 14, 1931

1,814,106

UNITED STATES PATENT OFFICE

EDWARD CHAUNCEY WORDEN, 1st, OF MILLBURN, NEW JERSEY, ASSIGNOR TO HANSON & ORTH, OF NEW YORK, N. Y., A FIRM COMPOSED OF CHARLES D. ORTH, SR., CHARLES D. ORTH, JR., MICHAEL J. SMITH, AND WILLIAM KNIGHT, JR.

MANUFACTURE OF CELLULOSE MATERIAL FROM MUSA FIBERS

No Drawing. Original application filed March 16, 1929, Serial No. 347,728. Divided and this application filed January 10, 1930. Serial No. 420,018.

This invention relates to the industrial treatment and utilization of purified cellulose high in alpha-cellulose and relatively low in hemicellulosic bodies and other inferior cellulosic products as obtained from various species, kinds, grades and varieties of the Musa family, of which botanical group *Musa textilis* and *Musa sapientum* are perhaps best known, but including also other species of the Musa group, such as *Musa basjoo*, *Musa paradisiaca* and others.

This invention is a divisional application of my copending application 347,728 filed March 16, 1929, for "cellulosic material from hemp fibers", and is related to my application Serial No. 347,457 filed March 15, 1929, for "manufacture of rayon from hemp fiber", and my application, Serial No. 356,890, filed April 20, 1929, for "purified cellulose material from hemp fiber".

Musa fibers when subjected to proper purification and isolation treatment, primarily on account of their original strength and resistivity to chemical reagents has been found an excellent and heretofore unexploited source for the preparation of cellulose high in alpha-cellulose and low in inferior cellulosic bodies especially applicable for esterification purposes, as in the rayon industry.

By "rayon" or "artificial filaments" is understood to comprise those esters and esters of cellulose, which after being placed in solution, are either de-esterified to a depolymerized cellulosic body or else used in the original esterified form, the ester in solution being extruded from orifices either into a liquid (as in the case of viscose and the cuprammonium celluloses) precipitating medium, or into a gaseous medium (nitrocellulose and acetated cellulose filaments), where the volatile solvent is removed and the filament formed as the result of solvent elimination either used commercially in the ester form (cellulose acetate) or denitrated in the case of nitrocellulose rayon to diminish the inflammability.

The organic esters of cellulose included in addition to the acetated celluloses, other alkyl-celluloses, as well as aryl-celluloses typified by benzyl-cellulose. Of the cellulose ethers, wherein a portion of the replaceable hydroxyl groups in the cellulose aggregate have been substituted by alkyl or aryl radicals, the ethyl-celluloses and benzyl-celluloses are typical. In all these inorganic and organic cellulose esters, and the cellulose ethers, irrespective of the nature of the substituents in hydroxyl replacement in the cellulose, it is essential for best results that the original cellulosic material should carry the maximum percentage of alpha-cellulose or resistant cellulose and a minimum of other celluloses and cellulose-like bodies which give inferior physical characteristics to the finished product.

And it is also a fact that has been repeatedly demonstrated in the older and better known nitrocellulose art, that an increase in tensile strength and other desirable physical characteristics of the original cellulose which is afterwards esterified, etherified and transformed into rayon products, results in the finished product possessing the same desirable properties of strength, extensibility, elasticity, etc., as possessed by the original fiber, usually to an augmented degree, assuming, of course, that the various steps in transformance of cellulose to finished artificial filament have been properly carried out.

The alpha-cellulose obtained from Musa fibers is distinguished by its great strength, and while not as readily susceptible to esterification procedure, yet also is not as readily oxidized, reduced, hydrolyzed or otherwise adversely affected by chemical treatment from the viewpoint of artificial filament formation.

In Musa fibers, it appears the tensile strength of the originally purified cellulose obtained therefrom, is intimately associated with the length of the individual fiber or cell, and admits of purification for the formation therefrom and separation of a cellulose or cellulosic material relatively high in alpha-cellulose and resistant cellulose, and containing but small amounts of hemicelluloses and inferior cellulosic products from the standpoint of artificial filament formation.

Those conversant intimately with the cellulose and cellulose ester and ether arts are aware that in an identical method and procedure of esterification or etherification, the initial length, strength and purity of the cellulose obtained therefrom and intended to be esterified or etherified, bears a definite relation to the strength of the esterified or etherified cellulose made therefrom, whether the final form of the product is the ester, or the products of ester de-esterification.

And this relationship of strength and tenacity is especially observable when the cellulose is esterified placed in solution and then deposited in the de-esterified or esterified form as in artificial filament formation. In other words, where the tensile strength and length of fiber of the initial, properly purified cellulose is relatively high, other conditions of treatment being the same, the esterified or etherified product, or the product obtained upon de-esterification will also be correspondingly high in tensile strength and other desirable characteristics. There is an increase in the strength of the ester or de-esterified product with an increase in tensile strength of the properly purified original cellulosic material especially if that cellulosic material has been so purified as to result in the isolation of a comparatively high percentage of alpha-cellulose substantially non-degraded.

For example, a relatively long staple cotton such as Sea Island, upon nitration will produce a nitrated cellulose, which upon solution and transformation into rayon or film, will give a stronger filament or film than is produceable when operating upon the same process with a short fiber cotton such as linters or fly.

There appears to be a well defined and comparable relationship between the length and strength of the original cellulose fiber, especially in its properly purified state as used for esterification purposes and the products produceable therefrom, irrespective of whether the final form is the ester, or the ester in which the acid radical in combination has previously been removed.

It is generally conceded that fibers of the Musa species comprise fibers of unusual natural length and strength, and it has been demonstrated that such fibers especially after having been subjected to an acceptable purification process esterify with inorganic and organic acids resulting in the production of artificial filaments and films of unusual stability and tenacity.

This generalization holds true likewise in the manufacture of artificial filaments, especially in the production of viscose rayon filaments from highly purified cellulose from Musa fibers, over both that of cellulose obtained from wood or cotton, departure from the standard methods of alkali-cellulose formation, transformation in to xanthate, and ripening of the same for viscose rayon formation being necessary primarily on account of variations in the chemical deportment of purified cellulose obtained from Musa fibers over wood and cotton celluloses.

This invention, therefore, is primarily concerned with the respective steps in treatment of the fibers of the Musa species for the preparation therefrom of a cellulosic material high in alpha-cellulose, and relatively low in hemicelluloses and other inferior cellulosic bodies, such purified cellulose being admirably adapted for transformation into rayons, artificial horsehair, braid, straw, etc., as well as films, by virtue of the desirable physical properties of strength, tenacity, uniformity in dyeing and other constants, when said purified Musa fiber cellulose is submitted to esterification and etherification treatments.

This invention is not concerned with the manufacture of filaments or threads for textile or spinning purposes where the cellulose in various stages and degrees of purification are used without previous esterification or being placed in solution. Neither is this invention addressed to the formation of writing and other papers from such cellulose.

It is immaterial whether the Musa fibers are subjected to an initial mechanical treatment of disintegration, or a chemical treatment of loosening the fibers by a retting or similar operation, or a combination of two or more of these operations has been applied to it. I prefer as the first chemical operation (the fiber having previously been placed in proper physical condition for maximum receptivity of chemical treatment), to boil the fibers or fiber bundles or aggregates at atmospheric pressure with an excess of water containing 5%–8% free alkali metal hydroxide as sodium hydroxide, 1%–4% alkali metal silicate and 1%–5% saponified vegetable or animal oil such as saponified cottonseed oil until the intercellular cementitious products appear entirely saponified, emulsified or solubilized, the boiling operation being maintained from 3 to 5 hours depending upon the physical condition of the Musa fibers, the percentage of non-cellulosic matter contained therein, and the relative refractoriness of the fibres. Towards the close of the boiling operation, a sample may be withdrawn, washed free from soluble impurities, dried and Soxhlet extracted with ether to obtain an index of the degree of completeness with which these impurities have been removed from the cellulosic portion. The other extract should not exceed 1% based on the original weight of fiber taken, where the purified cellulose is intended to be used for esterification purposes.

At the close of the boiling operation, the dark aqueous portion is allowed to drain off, a dilute alkali solution then added comprising 1%–2% alkali hydroxide and 0.5%–1.% alkali silicate, the wet mass preferably having been pressed to remove the maximum of solution of the first boiling process. After boiling again still at atmospheric pressure for a further period of about one hour, wash water is removed and the fibers washed with water, preferably heated, until the discarded wash water is practically colorless, and the fibers yield no soluble extract when a sample is withdrawn and boiled with a combination of alkali hydroxide, silicate and vegetable or animal oil.

It has been found that the combination of silicate and alkali hydroxide has a peculiarly beneficial purifying effect upon Musa fibers which are relatively high in siliceous matters, in that the emulsifying and saponifying effect of the alkali metal hydroxide, coupled with the scouring effect of the alkali silicate, and in the presence of the softening effect of the alkali salts of fatty acids, combines to remove extraneous materials with the minimum of degradation of the cellulose, measured by the standard of suitability for esterfication purposes. The soap in combination with alkali and silicate under the conditions and time of treatment appears to minimize formation of oxycellulose and bodies which lower the stability of the esterized cellulose made therefrom.

The fibers, still in the wet condition, are next preferably passed through crushing rollers and from this to an elutriating process where running water by gravity removes a small portion of non-alphacellulose material which at the same time was not saponified or emulsified by the previous treatment.

The fibers are now hydro-extracted and submitted to a partial bleaching operation, preferably with chlorine rather than calcium hypochlorite, care being taken that the fibers are not exposed to the atmosphere on account of proneness to oxidation and consequent deterioration for esterification purposes. What is known in the trade as a three-quarters bleach has been found most advisable, for the cellulose after esterification is usually submitted to a bleaching treatment, unless the artificial fibers are intended to be dyed full and dark shades. The fibers are finally washed free from reactants, and preferably dried at comparatively low temperatures, the moisture having been previously partially removed by centrifugalization or otherwise.

The purified Musa fiber cellulose thus obtained is in the form of a faint yellowish or whitish fluffy mass comprising from 90%–95% alpha-cellulose on the average, with an ether extractive less than 0.1%, ash under 0.1% beta-cellulose and gamma-cellulose combined content usually under 5%, practically insoluble in 17.5% sodium hydroxide (the strength normally employed in alkali-cellulose formation for viscose production), and admits of uniform nitration, acetation, xanthation or etherification with a maximum yield of superior product. The alkali-cellulose formative stage requires a longer period as likewise the ripening of the alkali-cellulose to the phase of desirable xanthation, and the cellulose xanthate requires usually a longer ripening time than where wood cellulose has been used to bring the xanthate solution to the stage optimum for spinning purposes.

I lay no claim to the use of high alpha-cellulose obtained from Musa fibers in any process or for the preparation of any product wherein the cellulose has not been first esterified or etherified, and the product so formed de-esterified or precipitated or coagulated into filament or film form.

But what I do claim is:

1. A process for the treatment of Musa fibers to obtain highly purified cellulose therefrom, comprising disintegrating said fibers, boiling for several hours at atmospheric pressure with a solution of alkali metal hydroxide, alkali metal silicate and alkali metal saponified fatty acid until emulsifiable and saponifiable matter has been removed from the cellulosic portion, washing until a neutral reaction has been obtained, partially bleaching with liquid chlorine solution, and washing until neutral, substantially as herein set forth.

2. A process for obtaining alpha-cellulose from Musa fibers, comprising boiling said fibers in a subdivided condition until the ether extract from said fibers yield not to exceed 1% based on the weight of the original fibers, in an aqueous solution at atmospheric pressure with a mixture of alkali hydroxide and silicate with a relatively smaller proportion of saponified oil, removing the alkaline solution, re-boiling with a dilute sodium hydroxide solution still at atmospheric pressure, washing in warm water until a neutral reaction is obtained from the discarded wash water, partially bleaching the wet fibrous mass, removing reactants by washing, and finally drying, as herein described.

3. A process for obtaining cellulose especially suited for esterification purposes from purified Musa fibers, comprising boiling the disintegrated or otherwise finely divided fibers with a solution comprising alkali metal hydroxide not exceeding eight percent, alkali metal silicate not exceeding about four percent, saponified oil not exceeding about five percent at atmospheric temperatures for from three to five hours, discarding the wash water as fully as possible, re-boiling for a short time with dilute alkali metal hydroxide until a sample withdrawn gives an extract from ether of not to exceed one percent, removing alkali by washing, passing the wet fibers through a crushing member and elutriating the lighter particles therefrom, bleaching the heavier particles, removing by washing the bleaching chemicals, and drying the purified cellulose as herein set forth.

4. A process for obtaining highly resistant cellulose containing a minimum of hemi-cellulosic and non-cellulosic bodies as obtained from Musa fibers, comprising boiling said fibers in a subdivided condition in a solution comprising approximately not less than five percent of alkali metal hydroxide, one percent alkali metal silicate and one percent saponified vegetable oil until saponifiable, emulsifiable and non-cellulosic bodies have been loosened and removed from the cellulosic portion, washing the mass until the wash waters are substantially colorless, treating said fibers with a weak alkali metal hydroxide solution at the boiling temperature for several hours if a sample of the product gives an ether extract appreciably greater than one percent, washing until neutral, bleaching with chlorine solution without submission of the fibers to contact with the atmosphere, removing reactants from the bleaching operation, and drying, substantially as described herein.

5. A process for treating Musa fibers to obtain therefrom a highly purified cellulose of composition substantially as herein described and especially suitable for purposes of esterification and etherification, comprising boiling the disintegrated fibers at atmospheric pressure for 3 to 5 hours with a solution containing alkali metal hydroxide, alkali metal silicate and saponified animal oil, continuing said alkaline treatment until the product shows an ether extract not substantially greater than one percent removing mechanically any non-cellulosic, non-saponifiable, non-emulsifiable material by an elutriative treatment, partially bleaching the filaments so obtained, washing until neutral and drying as herein set forth.

6. As a new article, resistant cellulose falling within the constants of alpha-cellulose, ether extractive, ash, beta- and gamma-cellulose as herein described and obtained from Musa fibers by treatment of said fibers as herein claimed.

EDWARD C. WORDEN, I.